United States Patent [19]

Brown

[11] 3,958,829

[45] May 25, 1976

[54] SAFETY ASSEMBLY FOR DUMP BEDS

[76] Inventor: Coy B. Brown, 2810 Holiday Drive, Arlington, Tex. 76010

[22] Filed: Jan. 17, 1975

[21] Appl. No.: 541,923

[52] U.S. Cl. .............................. 298/23 B; 298/23 D; 292/140
[51] Int. Cl.² .......................................... B60P 1/26
[58] Field of Search ............. 298/23 D, 23 S, 23 A, 298/23 B; 292/140, 197

[56] References Cited
UNITED STATES PATENTS

| | | | |
|---|---|---|---|
| 2,876,038 | 3/1959 | Ozanich | 298/23 B |
| 3,072,438 | 1/1963 | Livingston | 298/23 B |
| 3,379,475 | 4/1968 | Holland | 298/23 B |
| 3,625,566 | 12/1971 | Suuronen | 298/23 D |

Primary Examiner—Philip Goodman
Attorney, Agent, or Firm—Schmidt, Johnson, Hovey & Williams

[57] ABSTRACT

A mechanism for automatically shifting the tailgate latches of a vehicle-mounted dump bed as the same is being raised to insure that the tailgate is free to swing open and permit the load to begin discharging during raising of the dump bed and thus avoid a top-heavy, over-balanced condition. The mechanism also provides for the automatic latching of the tailgate during lowering of the dump bed and includes a trip arm mounted on the underside of the dump bed for rotation about a transverse, horizontal axis. The trip arm, which is operably linked with the tailgate latches for shifting the latter between open and closed positions, engages a device, mounted on the vehicle frame beneath the dump bed, that has a pair of vertically spaced trip latches, one of which is disposed to rotate the trip arm in one direction for shifting the tailgate latches to their respective open positions as the bed rises while the other trip latch is disposed to rotate the trip arm in an opposite direction as the dump bed lowers for shifting the tailgate latches to their closed positions.

9 Claims, 8 Drawing Figures

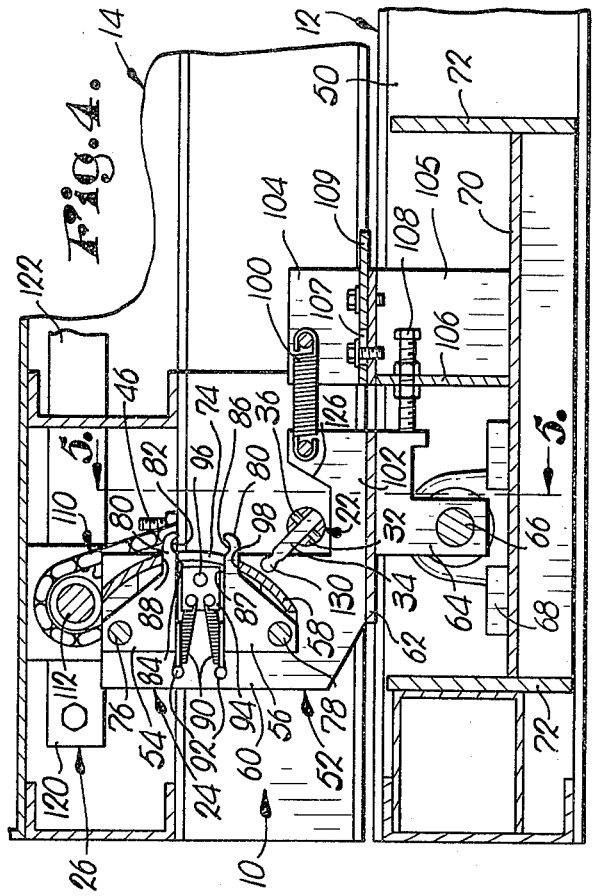
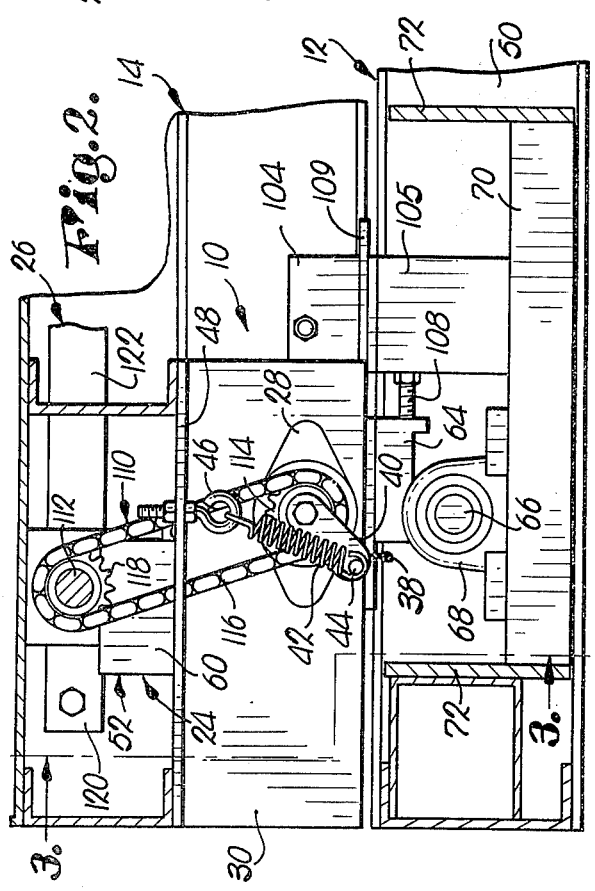
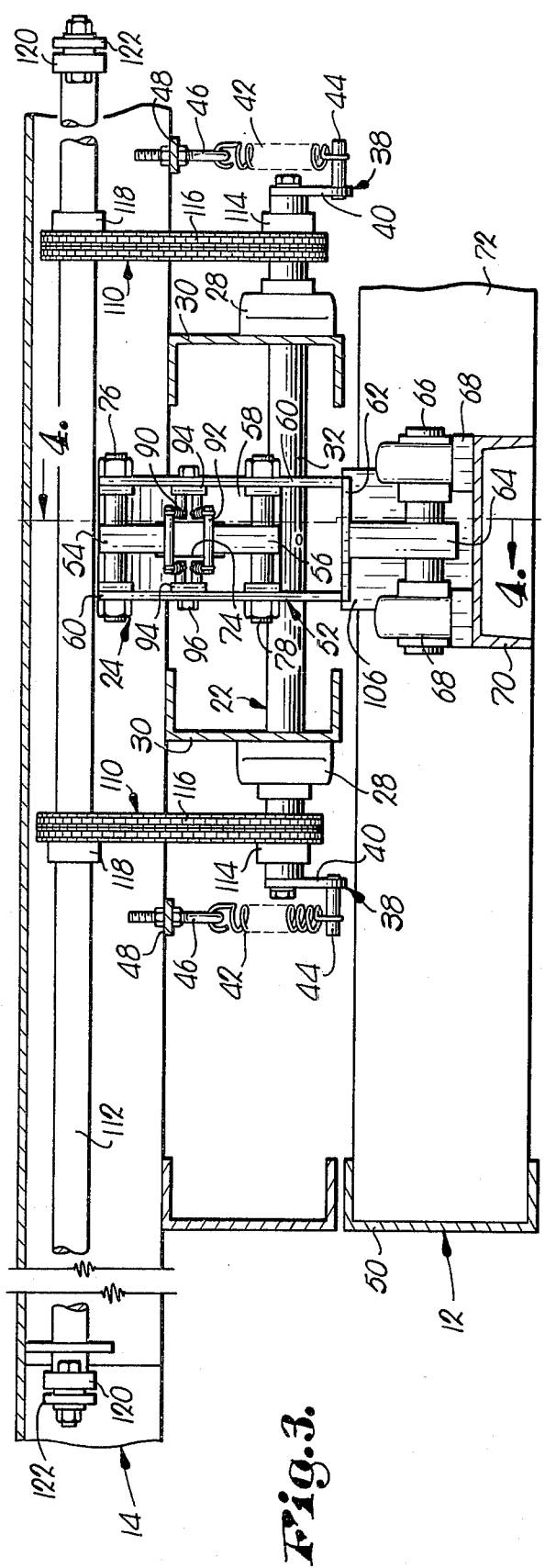

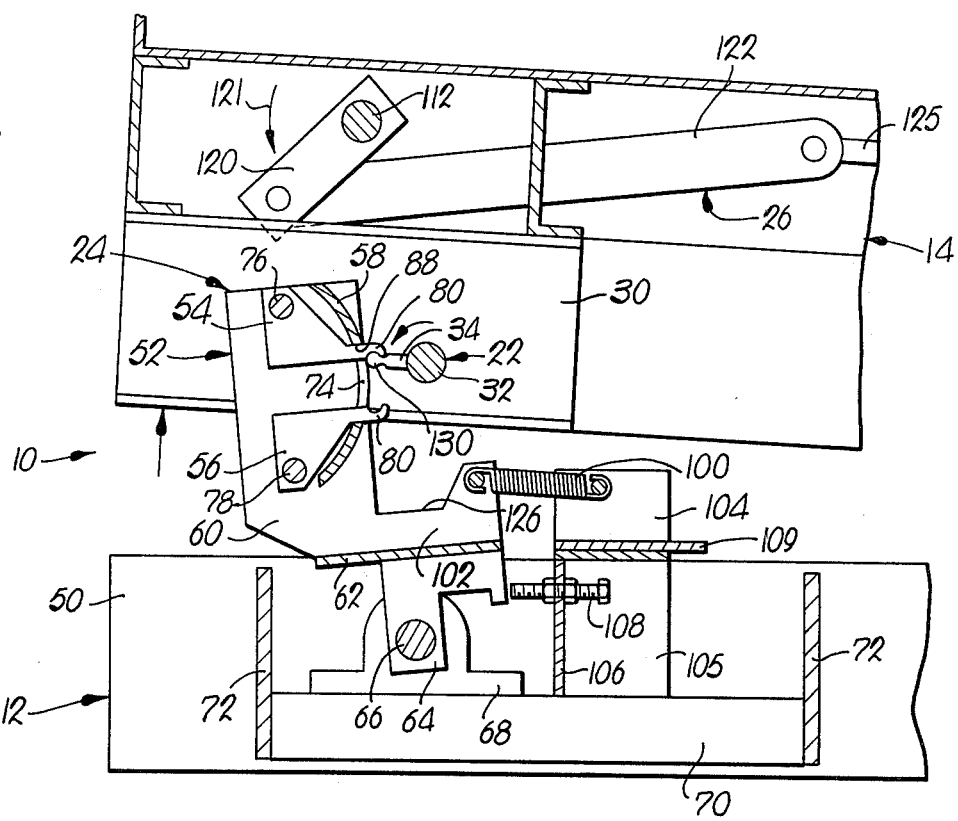
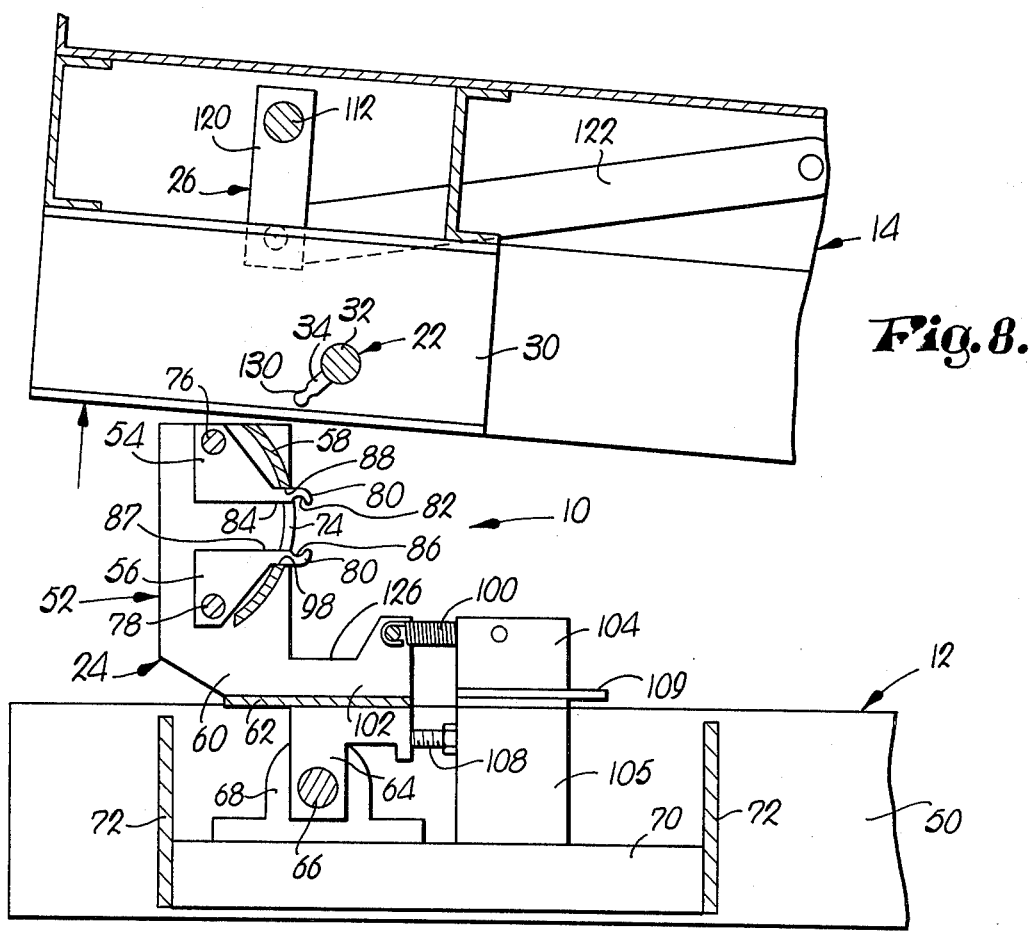

SAFETY ASSEMBLY FOR DUMP BEDS

This invention relates to an automatic tailgate release and latching mechanism for a swingable tailgate of a vehicle-mounted dump bed.

One of the problems associated with such a vehicle, commonly referred to as a dump truck, is that of making sure that the tailgate of the dump bed is released and free to swing to an open condition when the dump bed is raised for purposes of unloading. This is very important from a safety standpoint in that if the load does not begin to discharge during raising of the bed, the vehicle becomes top-heavy and is subject to tipping or overturning.

Conventionally, the dump bed is equipped with a pair of manually controlled tailgate latches operably connected to a handle located near the front of the dump bed that the vehicle operator must remember to shift before raising the dump bed. However, it has been known for the operator to forget or neglect to shift the tailgate latches for releasing the tailgate to a free-swinging condition before the bed is raised, therefore causing the aforementioned safety problem.

Furthermore, if the vehicle operator neglects to return the latch handle back to its original location for shifting the tailgate latches to a position for holding the tailgate in a closed condition after the load has been dispensed the dump bed lowered, the tailgate will continue to be able to swing free, quite likely causing premature loss of at least a portion of the next load. This becomes a problem, not only from the standpoint of premature loss of loads and the scattering of unwanted material along the path of travel of the vehicle, but also involves safety insofar as portions of the load may be discharged along a highway or road in the face of following traffic.

It is, therefore, a very important object of my invention to provide a safety assembly for dump beds that makes it possible to avoid a top-heavy situation in which the vehicle is subject to overturning or tipping because of operator negligence in releasing the tailgate latching mechanism prior to raising of the dump bed for unloading purposes.

It is another very important object of my invention to provide a safety assembly for dump beds which insures that the tailgate of a dump bed is always automatically released to a free-swinging condition as the dump bed is raised and is automatically latched and held in a closed condition when the dump bed is lowered.

It is a further important object of the instant invention to provide a dump bed tailgate releasing and latching mechanism that does not require the personal attention or manual shifting of any device by the vehicle operator during raising or lowering of the dump bed.

Yet another important object of my invention is to provide a release and latching mechanism that may be easily and conveniently installed on the vehicle and readily coupled to the existing manually controlled tailgate latch.

In the drawings:

FIG. 2 is an enlarged, fragmentary, side elevational view of the tailgate release and latching mechanism as it would appear when the dump bed is in its normally lowered position, portions of the vehicle and dump bed being shown in section;

FIG. 3 is a fragmentary, vertical, cross-sectional view taken substantially along line 3—3 of FIG. 2;

FIG. 4 is a fragmentary, vertical, cross-sectional view taken along line 4—4 of FIG. 3;

FIG. 7 is a view similar to FIG. 6 illustrating the action of the tailgate latch release and latching mechanism as the dump bed is rising; and FIG. 8 is a view similar to FIGS. 6 and 7 illustrating the disposition of the tailgate release and latching mechanism after the tailgate latches have been released during raising of the dump bed.

Figure 1:
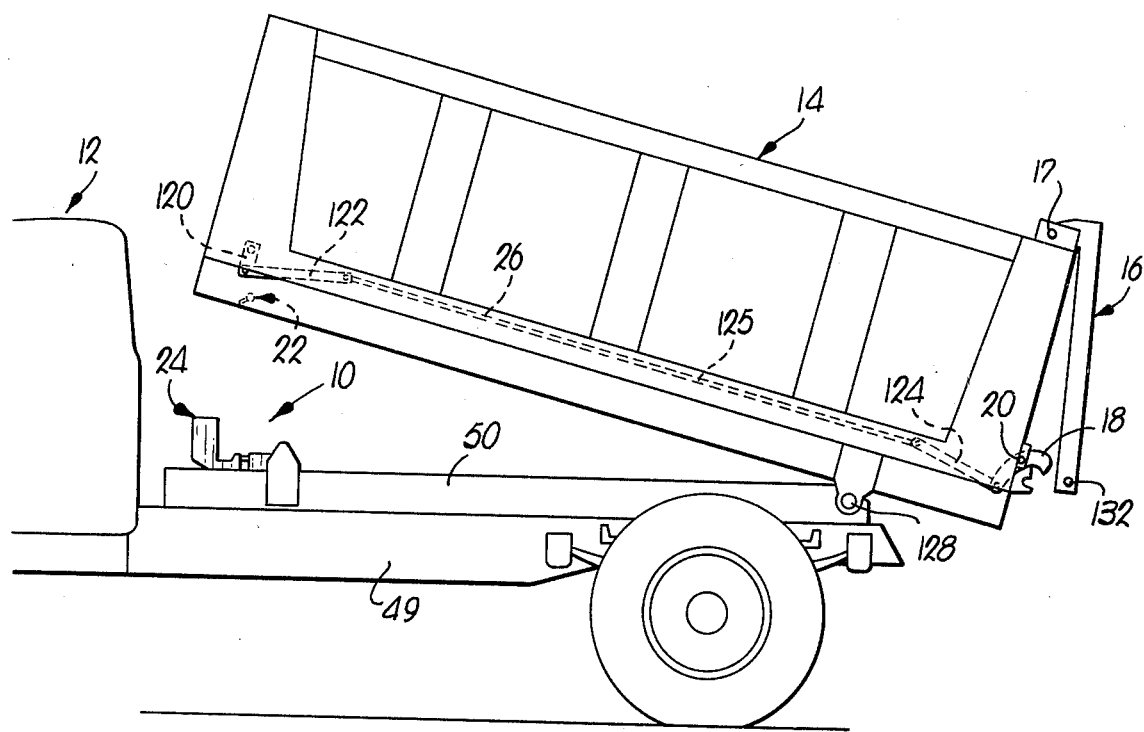
FIG. 1 is a fragmentary, side elevational view illustrating a vehicle having a dump bed provided with an automatic tailgate release and latching mechanism made pursuant to the present invention.

An automatic tailgate release and latching mechanism, broadly identified by the numeral 10, is provided for a vehicle 12 having a dump bed 14 mounted thereon and equipped with a tailgate 16 swingable about a horizontal, transverse axis 17 disposed adjacent the upper edge of the tailgate 16. A pair of shiftable tailgate latches 18 (only one shown) are conventionally mounted on the dump bed 14 with one latch being located at each end of the tailgate 16 adjacent the lower edge thereof. The tailgate latches 18 are each swingable about their respective axes 20 between a first position for holding the tailgate 16 in a closed condition, and a second position (as shown in FIG. 1) for releasing the tailgate 16 to swing to an open condition about axis 17, all of which is well understood by those skilled in this art.

The mechanism 10 is generally comprised of an elongate member 22 transversely mounted on the underside of the dump bed 14 and rotatable about a longitudinal, horizontal axis disposed transversely of the bed 14, a device 24 secured to the vehicle 12 beneath the dump bed 14 in a disposition to engage the member 22 as the latter passes thereby during raising or lowering of the dump bed to rotate the member 22 as the same passes by the device 24 and apparatus 26 interconnecting the member 22 with the tailgate latches 18 for shifting the latter from one position to the other upon corresponding rotation of the member 22 as it engages the device 24 during passage thereby.

Figure 5:
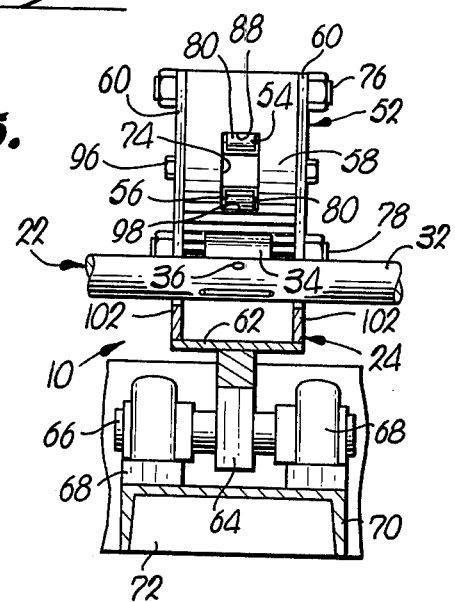
FIG. 5 is a fragmentary, vertical, cross-sectional view taken along line 5—5 of FIG. 4.

Support for the member 22 is provided by a pair of bearings 28 which, in turn, are suitably secured to a pair of longitudinally opposed, vertical channel members 30 attached to the underside of the dump bed 14 in a laterally spaced relationship. The member 22 is comprised of a round bar or shaft 32 that extends at each end beyond the carrier bearings 28 and has a horizontally disposed trip arm 34 generally centrally disposed on the shaft 32 between the two channels 30. The trip arm 34 protrudes radially outwardly from the longitudinal axis of the shaft 32 and, referring to FIGS. 4 and 5, it will be seen that the generally forwardly and upwardly inclined trip arm 34 has a generally flat, paddle-like configuration, extends through the shaft 32, and is held thereto by a pin 36 or other suitable fastener.

An over-center assembly 38 is located at each end of the shaft 32 with each assembly 38 including a generally downwardly inclined crank arm 40 and a cooperating, upwardly extending tension spring 42 secured at its lowermost end to a pin 44 of its associated crank arm 40 and at its upper end to a corresponding spring mount 46 adjustably carried by straps 48 secured to the underside of the dump bed 14. The relative angular relationship between the pins 44 of the crank arm assemblies 38 and the trip arm 34 is such that when the shaft 32 is rotated in either direction, the crank arms snap over-center as will be further explained hereinafter.

The device 24, which is mounted on the vehicle chassis 49 between the fore-and-aft extending rail members 50 on which the dump bed 14 rests, includes structure in the form of a generally upright, U-shaped frame 52 having a pair of trip latches 54 and 56, respectively, and a positioner 58 that holds the trip latches 54 and 56 in respective horizontally spaced-apart dispositions. The frame 52 includes a pair of laterally spaced, upright, generally L-shaped side plates 60 interconnected by a lower, horizontal bight plate 62, and is mounted between the longitudinal side rails 50 by means of a support leg 64 depending from the bight plate 62. A rotatable shaft 66, carried by a pair of pillow-block bearings 68 located at each end thereof, supports the frame 52 by way of the leg 64 for swinging movement of the frame 52 about a horizontal axis disposed transversely of the vehicle 12 and the dump bed 14. Support for the bearings 68 is provided by an elongate channel member 70 disposed in parallelism with the longitudinal rail members 50 centrally therebetween and attached at each end to fore-and-aft spaced chassis crosspieces 72 extending between the rail members 50.

The positioner 58 for the trip latches 54 and 56 defines a vertically arcuate, rearwardly curved, partial rear wall of the frame 52 extending between the side plates 60. Centrally located in the positioner 58 is a vertically oriented, rectangular opening 74 through which the trip latches 54 and 56 extend in a normally rearward direction relative to the dump bed 14 and the vehicle 12. The trip latches 54 and 56 are each individual carried between the side plates 60 for movement about respective, transverse, horizontal axes 76 and 78 that are in a vertically spaced relationship. The axes 76 and 78 are defined by crossbolts which extend between and interconnect the side plates 60.

The trip latches 54 and 56 are constructed of relatively heavy metal plate and present a somewhat triangular, upright configuration when viewed from the side, with each latch having a lever portion 80 extending rearwardly through the opening 74 and beyond the side plates 60. The outer free end of each lever portion 80 is rounded or chamfered with the upper trip latch 54 being chamfered along its upper, horizontal, rearmost edge and the lower trip latch 56 being chamfered along its lower, horizontal, rearmost edge. A horizontally oriented, half-moon, semicircular detent 82 extends across the underside 84 of the upper trip latch 54 adjacent the outer end of the lever portion 80 and vertically opposed and spaced from the upper detent 82 is a lower detent 86 in the topside 87 of the lower trip latch 56 adjacent the free end of the lever portion 80 thereof.

Normal positioning of the lever portion 80 of the upper trip latch 54 against the upper horizontal side 88 of the opening 74 is accomplished by means of a pair of tension springs 90 on opposite sides of the trip latch 54 secured at one end to a spring mount 92 extending forwardly, relative to the dump bed 14 and vehicle 12, from the trip latch 54 and at their opposite ends to a spring bracket 94 carried by a cross rod 96 interconnecting the side plates 60 at a point generally between the opposed lever portions 80. A similar arrangement of springs 90 orients the lever portion 80 of the lower trip latch 56 toward the bottom horizontal wall 98 of the opening 74 wherein here again, the pair of springs 90 on opposite sides of the trip latch 56 extend between a forwardly extending spring mount 92 and the spring bracket 94. Thus, it will be seen that in their normal dispositions, as best shown in FIG. 4, the respective lever portions 80 of the trip latches 54 and 56 are maintained in a vertically spaced relationship with their corresponding detents 82 and 86 being opposed to one another.

Substantially upright positioning of the device 24 is provided by a pair of springs 100 (only one shown) extending rearwardly from a lower leg section 102 of respective side plates 60 to a spring mounting bracket 104 adjustably secured for fore-and-aft movement on a bracket mount 105 that, in turn, is carried by the channel member 70. A forward upright wall 106 of the bracket mount 105 is provided with an adjustable stop bolt assembly 108 for positioning the frame 52 in cooperation with the springs 100. Therefore, it will be seen that the rearward rotational movement of the frame 52 about its mounting shaft 66 is limited by the adjusting assembly 108, while the tension of the springs 100 permits only yieldable forward rotation of the frame 52. Slotted holes 107 in a baseplate 109 of the bracket 104 permit movement of the latter bracket relative to the mount 105 for the purpose of adjusting the spring tension.

The apparatus 26 interconnecting the shaft 32 with the tailgate latches 18 is essentially the same as that found in conventional manual latch actuating mechanisms with the exception that a drive means in the form of a pair of chain and sprocket assemblies 110 interconnect the shaft 32 with a conventional cross shaft 112 rotatably mounted on the underside of the dump bed 14. The chain and sprocket assemblies 110 are located adjacent opposite ends of shaft 32 with a drive sprocket 114 of each assembly 110 being fixed to the shaft 32 between a corresponding bearing 28 and crank arm assembly 38. The drive assembly 110 further includes a double-strand drive chain 116 and a driven sprocket 118 secured to the cross shaft 112.

Conventionally, the cross shaft 112, which extends across substantially the entire width of the dump bed 14, has a forwardly reaching crank arm 120 secured at each end for rotation therewith. Extending longitudinally from front to back along the underside of the dump bed 14 proximal each lower edge thereof is linkage interconnecting each crank arm 120 with a corresponding tailgate latch 18. The linkage is comprised of a rearwardly extending link 122 that is interconnected, by a connecting rod 125, with a forwardly extending link 124 pivotally secured to a corresponding tailgate latch 18.

In operation, the relative disposition of the member 22 and the device 24 is shown in FIGS. 2–5 with the dump bed 14 being horizontally disposed and resting on the rail members 50 such that the member 22 is located within the clearance notches 126 of the side plates 60 and the trip arm 34 being in a generally upwardly and forwardly angled attitude as best seen in FIG. 4. Upon actuation of the dump bed raising mechanism (not shown) by the operator of the vehicle, the dump bed 14 begins to rise and pivot about a transverse, horizontal axis 128 located near the trailing end of the bed rails 50.

Figure 6:
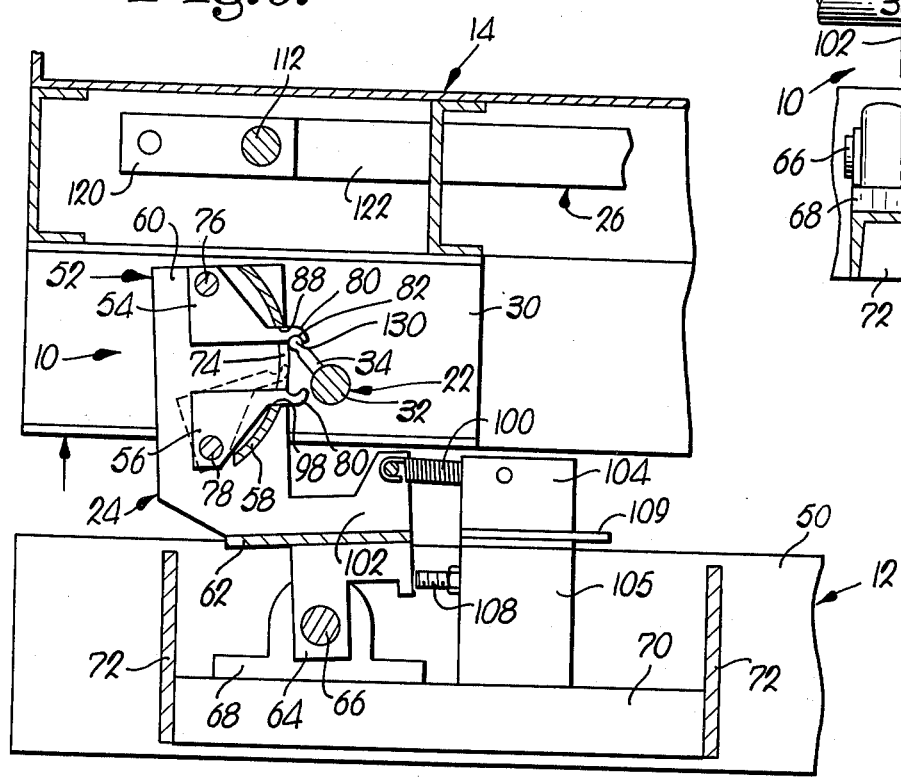
FIG. 6 is a fragmentary, side elevational view illustrating the relative disposition of the tailgate release and latching mechanism as the dump bed is beginning to rise and the tailgate release and latching mechanism is being actuated, portions of the dump bed and tailgate release and latching mechanism being shown in section.

As the dump bed 14 begins to rise, the path of travel of the member 22 carries the trip arm 34 into engagement with the lever portion 80 of the lower trip latch 56 which swings upwardly and forwardly away from the opening edge 98 against the bias of its springs 90, permitting the trip arm 34 to clear the lower trip latch 56. Continued raising of the dump bed 14 causes the rounded free end 130 of the trip arm 34 to seat in the downwardly facing detent 82 of the upper trip latch 54. As will be seen in FIG. 6, the opening 74 provides clearance for the upwardly and forwardly moving lower trip latch 56 while the upper wall 88 of the opening 74 precludes movement of the upper trip latch 54 relative to the positioner 58 thus causing a slight forward pivoting of the entire device 24 about its axis 66 against the bias of the springs 100.

Referring now to FIG. 7, it will be seen that as the dump bed 14 continues to rise, the lever portion 80 of the upper trip latch 54 restrains the trip arm 34 and deflects the same to a downwardly inclined position causing the member 22 to rotate in a counterclockwise direction in its carrier bearings 28 (viewing FIG. 7). Rotation of the member 22 causes the crank arm assemblies 38 to also swing downwardly in a counterclockwise direction and snap over-center, driving the chain assemblies 110 to cause a corresponding rotation of the cross shaft 112. Rotation of the cross shaft 112 swings the crank arms 120 in a counterclockwise direction as shown by the arrow 121 in FIG. 7 to shift the linkage members 122–126 rearwardly and thus cause the tailgate latches 18 to also move in a counterclockwise direction about their respective axes 20 for releasing their associated pins 132 on the tailgate 16 permitting the latter to then swing free as the bed 14 continues to rise.

As the crank arm assemblies 38 snap over-center the end 130 of the trip arm 34 clears the upper latch 54 and the device 24 resumes its normal upright disposition with the latches 54 and 56 again in their normal positions while the trip arm 34 is now retained in a generally downwardly and forwardly angle disposition by the over-center assemblies 38.

Latching of the tailgate 16 is automatically accomplished by a reverse sequence of events with the upper trip latch 54 swinging to an out-of-the-way position against the bias of its springs 90 as the trip arm 34 strikes the lever portion 80 after which the free end 130 is seated in the upwardly facing detent 86 of the lower trip latch 56 causing the member 22 to now rotate in a clockwise direction with the trip arm 34 returning to its original upwardly inclined position as it is deflected. The crank arm assemblies 110 snap forwardly overcenter to drive the chain assemblies 110 in an opposite direction for rotating the cross shaft 112 in a clockwise direction thus bringing the linkages 122–126 forwardly relative to the bed for swinging the tailgate latches 18 to a closed position as the tailgate 16 swings toward the dump bed 14 and thus trap the pins 132.

The spring biasing of the device 24 as well as the trip latches 54 and 56 provides for a relatively free movement of the latches 54 as the trip arm 34 moves therepast and insures that each of the components move to their respective positions for reliable trouble-free operation of the mechanism 10. The arcuate configurtion of the positioner 58 as well as the broad, paddle-like horizontal configurations of the trip arm 34 and trip latches 54 and 56 respectively, provide smooth working and proper engagement as the dump bed 14 is raised or lowered.

The positive engagement of the relative components plus the positive action of the over-center crank arm action insures that the tailgate latches 18 are always properly positioned to either release or engage their associated pins 132 and thus provide the safety that is needed during the operation of such a vehicle. The automatic action of the mechanism 10 removes any need for alertness on the part of the vehicle operator to be sure that he has released the tailgate latches 18 before raising the dump bed and discharging the load therefrom to avoid the chance of the vehicle becoming top-heavy and tipping over as might occur if the dump bed 14 is raised without releasing the tailgate 16. By the same token, the mechanism 10 insures latching of the tailgate 16 once the bed has been lowered to make sure that everything is in order to receive the next load and there is no change of premature discharge of the load from the dump bed 14.

It is to be further noted that the mechanism 10 is actuated soon after the dump bed 14 begins to rise so that the tailgate 16 is free to swing to an open condition almost immediately and permit discharge of the load during raising of the dump bed. Further, the mechanism 10 does not permit premature latching of the tailgate in the event the tailgate is caused to swing toward the latches 18 before the entire load is discharged inasmuch as the latches are not shifted to their first or holding positions until just before the dump bed has been completely lowered.

Having thus described the invention, what is claimed as new and desired to be secured by Letters Patent is:

1. An automatic tailgate release and latching mechanism for a vehicle-mounted dump bed having a swingable tailgate and at least one tailgate latch shiftable between a first position for holding said tailgate in a closed condition and a second position for releasing said tailgate to swing to an open condition, said mechanism comprising:

an elongate member mounted on said dump bed and rotatable about a horizontal, transverse axis;

apparatus interconnecting said member with the tailgate latch for shifting the latter from one to the other of said positions when said member is rotated; and a device located on said vehicle proximal said dump bed for alternately rotating the member in opposite directions, said device having structure normally disposed in the path of travel of said member as the latter passes thereby during raising of the dump bed to engage the member for rotating the same in one direction to shift said latch to said first position during raising of the dump bed and to shift said latch to said second position during lowering of the dump bed, said member including a trip arm fixedly attached thereto, said structure intersecting the path of travel of said trip arm to deflect the same from one disposition to an alternate disposition as the dump bed is raised or lowered whereby said member is caused to rotate in a corresponding direction about is longitudinal axis in response to resistance encountered by said trip arm upon engagement of the same with said structure, said structure including a pair of trip latches engageable by said trip arm, a first one of said pair of latches being positioned to deflect said trip arm from said one disposition to said alternate disposition during passage thereby as the dump bed is raised to cause said member to rotate in said one direction, a second one of said pair of latches being positioned to deflect said trip arm from said alternate disposition to said one disposition during passage thereby as the dump bed is lowered to cause said member to rotate in said opposite direction.

said trip arm being oscillatable between said one disposition and said alternate disposition in response to the engagement with said trip latches as the dump bed is alternately raised and lowered, there being an over-center crank arm assembly operably coupled with said member to snap across an overcenter point during movement of the trip arm from one of said dispositions to the other thereof for releasably holding said trip arm in either of said dispositions.

2. An automatic tailgate release and latching mechanism for a vehicle-mounted dump bed having a swingable tailgate and at least one tailgate latch shiftable between a first position for holding said tailgate in a closed condition and a second position for releasing said tailgate to swing to an open condition, said mechanism comprising:

an elongate member mounted on said dump bed and rotatable about a horizontal, transverse axis;

apparatus interconnecting said member with the tailgate latch for shifting the latter from one to the other of said positions when said member is rotated; and a device located on said vehicle proximal said dump bed for alternately rotating the member in opposite directions, said device having structure normally disposed in the path of travel of said member as the latter passes thereby during raising of the dump bed to engage the member for rotating the same in one direction to shift said latch to said first position during raising of the dump bed and to shift said latch to said second position during lowering of the dump bed, said member including a trip arm fixedly attached thereto, said structure intersecting the path of travel of said trip arm to deflect the same from one disposition to an alternate disposition as the dump bed is raised or lowered whereby said member is caused to rotate in a corresponding direction about its longitudinal axis in response to resistance encountered by said trip arm upon engagement of the same with said structure.

said structure including a pair of trip latches engageable by said trip arm, a first one of said pair of latches being positioned to deflect said trip arm from said one disposition to said alternate disposition during passage thereby as the dump bed is raised to cause said member to rotate in said one direction, a second one of said pair of latches being positioned to deflect said trip arm from said alternate disposition during passage thereby as the dump bed is lowered to cause said member to rotate in said opposite direction.

said trip latches projecting horizontally into the path of travel of said trip arm in a vertically spaced relationship with said first trip latch being disposed above said second trip latch.

3. A mechanism as claimed in claim 2, wherein each trip latch is independently and vertically swingable about a horizontal, transverse axis in response to said engagement by said trip arm during movement of the latter thereby, said structure including a positioner for holding said first trip latch in its normal horizontal disposition when engaged by said trip arm during raising of said dump bed and for holding said second trip latch in its normal horizontal disposition when engaged by said trip arm during lowering of said dump bed.

4. A mechanism as claimed in claim 3, wherein said structure includes yieldable bias means for continuously urging said trip latches toward their respective horizontal dispositions, said first trip latch being swingable away from said trip arm and said positioner against the action of said bias means when said dump bed is being lowered, said second trip latch being swingable away from said positioner against the action of said bias means when said dump bed is being raised.

5. An automatic tailgate release and latching mechanism for a vehicle-mounted dump bed having a swingable tailgate and at least one tailgate latch shiftable between a first position for holding said tailgate in a closed condition and a second position for releasing said tailgate to swing to an open condition, said mechanism comprising:

an elongate member mounted on said dump bed and rotatable about a horizontal, transverse axis;

apparatus interconnecting said member with the tailgate latch for shifting the latter from one to the other of said positions when said member is rotated; and a device located on said vehicle proximal said dump bed for alternately rotating the member in opposite directions, said device having structure normally disposed in the path of travel of said member as the latter passes thereby during raising of the dump bed to engage the member for rotating the same in one direction to shift said latch to said first position during raising of the dump bed and to shift said latch to said second position during lowering of the dump bed, said member including a trip arm fixedly attached thereto, said structure intersecting the path of travel of said trip arm to deflect the same from one disposition to an alternate disposition as the dump bed is raised or lowered whereby said member is caused to rotate in a corresponding direction about its longitudinal axis in response to resistance encountered by said trip arm upon engagement of the same with said structure, said structure including a pair of trip latches engageable by said trip arm, a first one of said pair of latches being positioned to deflect said trip arm from said one disposition to said alternate disposition during passage thereby as the dump bed is raised to cause said member to rotate in said one direction, a second one of said pair of latches being positioned to deflect said trip arm from said alternate disposition to said one disposition during passage thereby as the dump bed is lowered to cause said member to rotate in said opposite direction, said trip latches each having a trip arm detent, said detents being opposed to each other to receive said trip arm during corresponding movement of said trip arm thereby.

6. A mechanism as claimed in claim 2, wherein said trip arm is in a downwardly oriented, angular disposition subsequent to engagement thereof with said first trip latch during raising of the dump bed and wherein said trip arm is in an upwardly oriented, angular disposition subsequent to engagement thereof with said second trip latch during lowering of the dump bed.

7. An automatic tailgate release and latching mechanism for a vehicle-mounted dump bed having a swingable tailgate and at least one tailgate latch shiftable between a first position for holding said tailgate in a closed condition and a second position for releasing said tailgate to swing to an open condition, said mechanism comprising:

an elongate member mounted on said dump bed and rotatable about a horizontal, transverse axis:

apparatus interconnecting said member with the tailgate latch for shifting the latter from one to the other of said positions when said member is rotated; and a device located on said vehicle proximal said dump bed for alternately rotating the member in opposite directions, said device having structure normally disposed in the path of travel of said member as the latter passes thereby during raising of the dump bed to engage the member for rotating the same in one direction to shift said latch to said first position during raising of the dump bed and to shift said latch to said second position during lowering of the dump bed, said member including a trip arm fixedly attached thereto, said structure intersecting the path of travel of said trip arm to deflect the same from one disposition to an alternate disposition as the dump bed is raised or lowered whereby said member is caused to rotate in a corresponding direction about its longitudinal axis in response to resistance encountered by said trip arm upon engagement of the same with said structure, said trip arm being oscillatable between said one disposition and said alternate disposition in response to the engagement with said structure, there being an over-center crank arm assembly operably coupled with said member to snap across an overcenter point during movement of the trip arm from one of said dispositions to the other thereof for releasably holding said trip arm in either of said dispositions.

8. A mechanism as claimed in claim 7, wherein said apparatus includes reciprocably shiftable linkage coupled with said tailgate latch for shifting the same from one of said positions to the other, said apparatus further including drive means for said linkage interposed between and operably coupling said linkage and said member for converting the rotational movement of said member in either direction to a substantially linear shifting movement of said linkage in a corresponding direction.

9. A mechanism as claimed in claim 8, wherein said drive means is comprised of a rockshaft having a crank pivotally secured to said linkage and a chain and sprocket assembly interconnecting said rockshaft and said member.

* * * * *